(12) United States Patent
Pohan et al.

(10) Patent No.: US 7,522,699 B2
(45) Date of Patent: Apr. 21, 2009

(54) HOUSING WALL FOR A DETECTOR HOUSING AND DETECTOR HOUSING

(75) Inventors: Claus Pohan, Baiersdorf (DE); Gottfried Tschopa, Rednitzhembach (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 11/984,275

(22) Filed: Nov. 15, 2007

(65) Prior Publication Data

US 2008/0118025 A1 May 22, 2008

(30) Foreign Application Priority Data

Nov. 16, 2006 (DE) .................. 10 2006 054 055

(51) Int. Cl.
*G01N 23/00* (2006.01)
(52) U.S. Cl. ........................................ 378/19; 378/189
(58) Field of Classification Search ................... 378/19, 378/189
See application file for complete search history.

(56) References Cited

U.S. PATENT DOCUMENTS

| | | | |
|---|---|---|---|
| 5,299,249 A | 3/1994 | Burke | |
| 6,252,934 B1 | 6/2001 | Goren | |
| 7,372,938 B2 * | 5/2008 | Pohan et al. | .................. 378/19 |
| 2004/0028185 A1 | 2/2004 | Schlogl | |
| 2006/0126782 A1 | 6/2006 | Pohan | |
| 2007/0183557 A1 | 8/2007 | Manzke | |

FOREIGN PATENT DOCUMENTS

| | | |
|---|---|---|
| DE | 102004055752 A1 | 6/2006 |
| WO | WO 2006018763 A1 | 2/2006 |

OTHER PUBLICATIONS

Pollermann, Max: Bauelemente der Physikalischen Technik, Berlin (u.a.), Springer, 1972, ISBN 3-540-05613-0, S. 85-108.

* cited by examiner

*Primary Examiner*—Jurie Yun
(74) *Attorney, Agent, or Firm*—Harness, Dickey & Pierce, P.L.C.

(57) ABSTRACT

A housing wall is disclosed for a detector housing of a detector unit. Further, a detector housing is disclosed, which has the housing wall, for an X-ray computed-tomography scanner. In at least one embodiment, to improve the cooling of detector elements which are accommodated in the detector housing, one or more ventilation openings, provided with at least one closure device to interact with centrifugal force regulators, are provided for an air flow to pass through.

25 Claims, 6 Drawing Sheets

HOUSING WALL FOR A DETECTOR HOUSING AND DETECTOR HOUSING

PRIORITY STATEMENT

The present application hereby claims priority under 35 U.S.C. §119 on German patent application number DE 10 2006 054 055.7 filed Nov. 16, 2006, the entire contents of which is hereby incorporated herein by reference.

FIELD

Embodiments of the invention generally relate to a housing wall for a detector housing, and/or to a detector housing, such as one which has the housing wall for example, for an X-ray computed-tomography scanner.

BACKGROUND

Detectors for third-generation X-ray computed-tomography scanners have a multiplicity of detector elements for detection of X-ray radiation. The detector elements are generally provided with a detector housing, which surrounds them, for protection. The detector housing may be formed integrally or may be composed of a plurality of separate housing walls.

Detector elements are provided in the detector housing and may comprise electronic circuits for processing signals from the detector elements. As the number of detector elements increases, they are arranged ever more densely and cause not inconsiderable heat losses during operation. This results in heating, and temperature fluctuations, in the detector housing and, as a result of this, in the detector elements. The temperature fluctuations lead to parameter changes and contribute to the creation of image artifacts.

In order to cool the interior of the detector housing, in particular of the detector elements and of the circuits, it is known, for example, for a cooling air flow through the detector housing to be produced by way of a fan provided on the detector housing. The fan admittedly makes it possible to largely avoid fluctuations in the cooling power and the temperature in the detector housing. However, this has the disadvantage that the life of the fan is reduced considerably as a result of the centrifugal forces and torques which occur during rotation of the detector about a rotation center of the X-ray computed-tomography scanner.

Instead of the fan provided on the detector housing, inlet and outlet openings can also be provided in the housing walls of the detector housing, through which a directed air flow can be passed by means of an external, stationary fan. This has the disadvantage that temperature fluctuations in the detector housing during operation of the computed-tomography scanner cannot reliably be avoided.

SUMMARY

At least one embodiment of the invention improves upon or even overcomes at least one disadvantage of the prior art. One particular aim of at least one embodiment is to provide a housing wall by which temperature fluctuations in a detector housing can be safely and reliably avoided for a detector unit for an X-ray computed-tomography scanner. A further aim of at least one embodiment is that it should be possible to produce the housing wall particularly easily and at low cost. An additional aim is to specify a detector housing for an X-ray computed-tomography scanner which allows temperature fluctuations occurring in it to be reliably avoided.

According to at least one embodiment of the invention, a housing wall is provided for a detector housing of a detector unit which can be rotated about a rotation center of an X-ray computed-tomography scanner, having a multiplicity of detector elements in order to detect X-ray radiation, comprising
    a plurality of ventilation openings for a directed air flow, which is intended for cooling of the detector elements, to be passed through the detector housing,
    one or more closure devices for at least partial closure of the ventilation openings, and
    one or more centrifugal force regulators, with
the centrifugal force regulator(s) each interacting with one or more of the closure devices such that they
    are forced to a closed position in which the ventilation openings are at least partially closed by the closure device(s), and
    the ventilation openings are opened as a function of the magnitude of a centrifugal force which occurs during rotation about the rotation center.

The proposed housing wall is based on the knowledge that, at comparatively high rotation speeds and comparatively short rotation times, for example about 330 ms, of the detector unit about the rotation center the air flow is considerably changed, in comparison to stationary operation, for the same remaining opening cross section of the ventilation openings. The air flow in general changes in such a manner that its flow speed decreases as the rotation speed increases. This leads to a reduced air flow rate, reduced cooling power and in consequence to temperature fluctuations. However, the closure device(s) which is regulated by centrifugal forces and is provided on the housing wall makes it possible to ensure that the opening cross section which is available to the air flow is increased as the rotation speed increases. This increase makes it possible to ensure that the amount of air passing through the housing remains essentially constant as the rotation speed increases. This makes it possible to achieve a constant cooling power and an essentially constant temperature for the detector elements. It is possible to ensure that the signals which are detected by the detector elements are of a constant high quality, and can be used to produce X-ray images that are particularly low in artifacts.

For the purposes of embodiments of the present invention, the expression "detector element" should be understood as meaning not only a detector element as such, but also a detector element which has electronic circuits and components for signal processing.

The closure device(s) can be designed such that the ventilation openings associated with it are completely closed in the stationary state, when there is no centrifugal force. This is particularly advantageous when further ventilation openings without any closure device(s) are provided, allowing an adequate air flow in the stationary state. If no such further ventilation openings are provided, then, in order to ensure an adequate air flow to cool the detector elements when stationary, some of the ventilation openings are only partially closed by closure device(s) in the stationary state. An adequate opening cross section can be provided in order to form a basic air flow for cooling. Combinations of the abovementioned options are also feasible, for example in the latter case it is additionally possible to provide the abovementioned further ventilation openings.

The closure device(s) and centrifugal force regulators make it possible to control the total opening cross section of the ventilation openings, and therefore the air flow flowing through the housing, such that it is possible to ensure an essentially constant cooling power.

In each case one centrifugal force regulator, which interacts with a closure device, can be provided for each ventilation opening. It is therefore possible to individually set each of the ventilation openings to open and close as a function of the centrifugal force.

The response of the centrifugal force regulators can be varied as a function of the position on the housing wall and the arrangement relative to the detector elements. It is also possible for all of the ventilation openings which are controlled by centrifugal force in the housing wall to be provided with one and only one centrifugal force regulator, and with one and only one closure means interacting with it. This makes it possible to ensure that the number of moving parts can be reduced to a minimum.

It is also possible for in each case one centrifugal force regulator and one closure device to be associated with a plurality of ventilation openings, for example a subset of the ventilation openings. Apart from this, combinations of the above options are also feasible. Thus, overall, the openings cross section of the ventilation openings can be optimally matched to the respective circumstances and to the flow conditions during operation. This makes it possible to ensure a particularly uniform cooling power both in the stationary state and during rotation of the detector unit, in particular at different rotation speeds.

The ventilation openings may be provided along a straight or curved line with respect to the rotation center. The ventilation openings may be provided in a corresponding manner to the arrangement of the detector elements, which are in general arranged on a curved or else possibly a straight mount in the housing, thus making it possible to achieve particularly optimum cooling of the detector elements. With regard to the number of ventilation openings, one ventilation opening which is regulated by centrifugal force can preferably be provided for each detector element such that the air flow through the ventilation opening strikes the detector elements directly, or flows past them in order to cool them in an advantageous manner.

The closure device(s) may be in the form of a slide. The slide-like closure device(s) may be in the form of a plate which can be used to appropriately cover one or more ventilation openings. Holes corresponding to the ventilation openings can be provided in the plate and are made to coincide increasingly with the ventilation openings, in order to open them.

It is also possible to use plates without openings, and to regulate an opening cross section of the ventilation opening by appropriate coverage of the ventilation opening by the plate. The plate can be moved parallel to the opening plane of the ventilation opening or openings, in order to open and close, or to cover and release, the ventilation opening or openings. For this purpose, guides may be provided on the housing wall and may, for example, be in the form of one or more guide rails, slots or guide rollers, etc.

It is particularly advantageous for the closure device(s) to be moved in the radial direction with respect to the rotation center. As such, the guides and closure device(s) are loaded particularly lightly by the centrifugal forces which occur during rotation. The movement with respect to the rotation center may also be in the azimuth direction. This makes it possible to reduce the load and the wear by the use of a particularly low-mass embodiment of the closure device(s).

The centrifugal force regulator may comprise a spring which is provided such that the closure device(s) is forced to the closed position. In this case, by way of example, a first end of the spring can be fitted to the closure device(s), and a second end of the spring can be fitted to the housing wall, or to an attachment device(s) provided on the housing wall. This allows the ventilation opening which is controlled by centrifugal force to be designed to be particularly simple. In order to allow locally position-dependent centrifugal-force control, which is individual for each respective ventilation opening, to be achieved, the springs may have different spring constants, or the closure device(s) may have different masses. The spring may be any desired spring, in particular a helical spring, a spiral spring or a leaf spring.

However, it is also possible for the centrifugal force regulator to comprise a movable control mass and a control mechanism. The control mechanism is coupled to the control mass and the closure device(s) such that a first position change of the control mass, which is caused by a change in the centrifugal force, is translated to a corresponding second position change of the closure device(s). In this case, it is advantageous to provide only one centrifugal force regulator and one closure device. One advantage in this case is that the housing wall has fewer moving parts. The control mass may be prestressed, for example by way of a tension or compression spring, leaf spring or spiral spring, such that the closure means is forced to the closed position.

The control mechanism may comprise a toothed ring, a toothed rod and/or a toothed wheel. The toothed wheel or the toothed ring may be attached to the housing wall such that it can rotate about a rotation axis. The first position change of the control mass can be translated to the second position change of the closure device(s) by the toothed wheel or the toothed ring engaging in two toothed rods, of which in each case one is provided on the control mass and on the closure means. Different tooth systems are used on the toothed rods, toothed wheels or toothed rings, with different control masses or different spring prestresses of the control masses and any desired combinations thereof, being used for individual centrifugal force control of the ventilation openings, as a function of the position.

According to a further feature of at least one embodiment of the invention, a detector housing is provided having a housing wall according to at least one embodiment of the invention and as described above, whose advantages and advantageous effects are directly evident from the advantages and advantageous effects of the housing wall according to at least one embodiment of the invention.

BRIEF DESCRIPTION OF THE DRAWINGS

The invention will be explained in more detail in the following text with reference to example embodiments. In the figures.

In the figures, identical or functionally identical elements are in each case provided with the same reference symbols. The figures are not to scale, and the scales vary between the individual figures.

DETAILED DESCRIPTION OF THE EXAMPLE EMBODIMENTS

The terminology used herein is for the purpose of describing particular embodiments only and is not intended to be limiting of the present invention. As used herein, the singular forms "a", "an", and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Spatially relative terms, such as "beneath", "below", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, term such as "below" can encompass both an orientation of above and below. The device may be otherwise oriented (rotated 90 degrees or at other orientations) and the spatially relative descriptors used herein are interpreted accordingly.

Although the terms first, second, etc. may be used herein to describe various elements, components, regions, layers and/or sections, it should be understood that these elements, components, regions, layers and/or sections should not be limited by these terms. These terms are used only to distinguish one element, component, region, layer, or section from another region, layer, or section. Thus, a first element, component, region, layer, or section discussed below could be termed a second element, component, region, layer, or section without departing from the teachings of the present invention.

In describing example embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner.

Referencing the drawings, wherein like reference numerals designate identical or corresponding parts throughout the several views, example embodiments of the present patent application are hereafter described. Like numbers refer to like elements throughout. As used herein, the terms "and/or" and "at least one of" include any and all combinations of one or more of the associated listed items.

Figure 1:
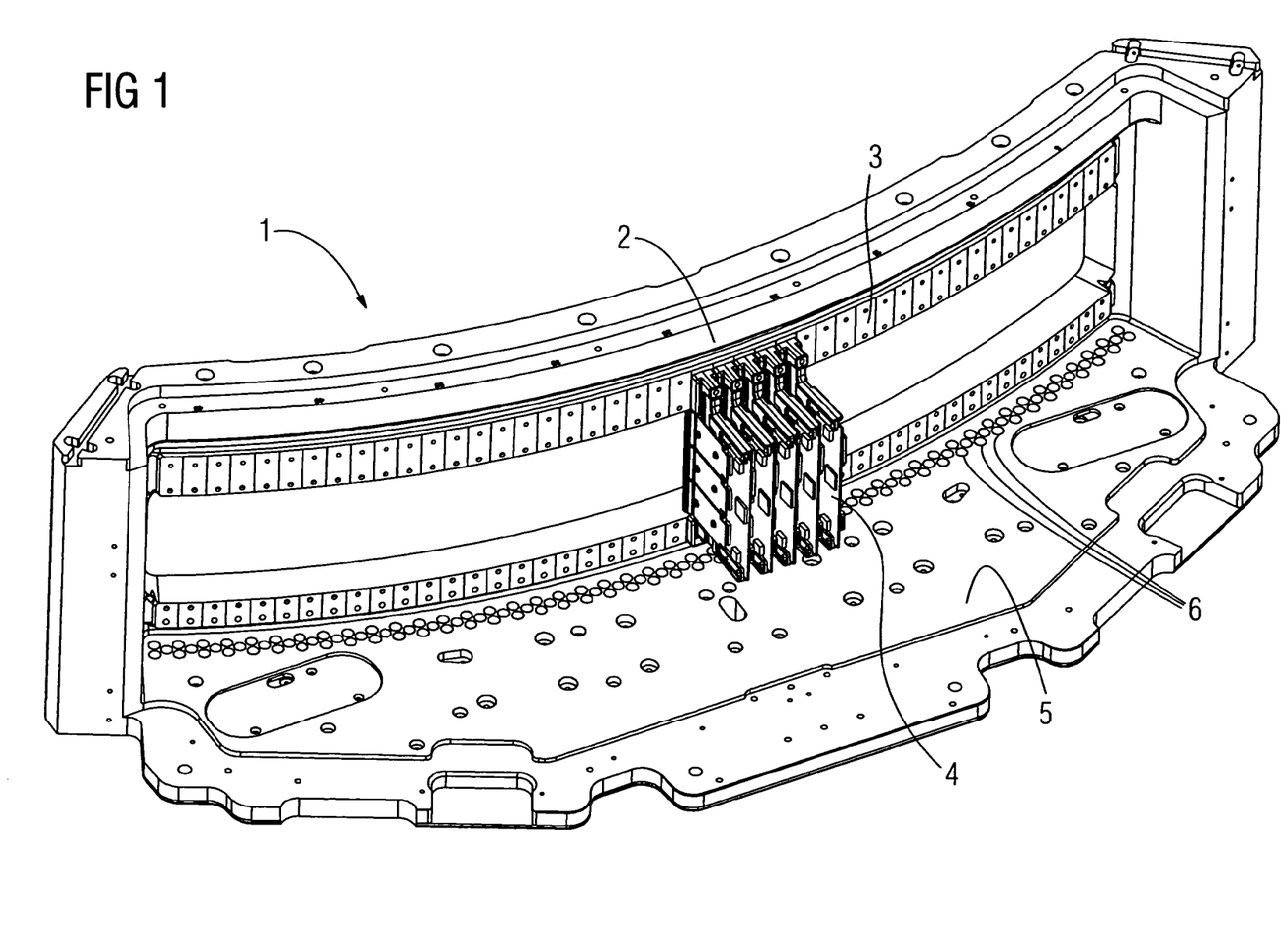
FIG. 1 shows, schematically, an open detector housing.

FIG. 1 shows, schematically, an open detector housing 1. Attachment elements 3 for attachment of a multiplicity of detector elements 4, only five of which are shown, are provided on a frame 2. Attachment devices such as screws, latching tabs, plug connections and the like can be used for attachment of the detector elements 4 to the attachment elements 3. A multiplicity of through-holes 6 are provided in a rear side wall 5, at the same height as the detector elements 4, as inlets and outlets for a cooling air flow through the detector housing 1.

Figure 2:
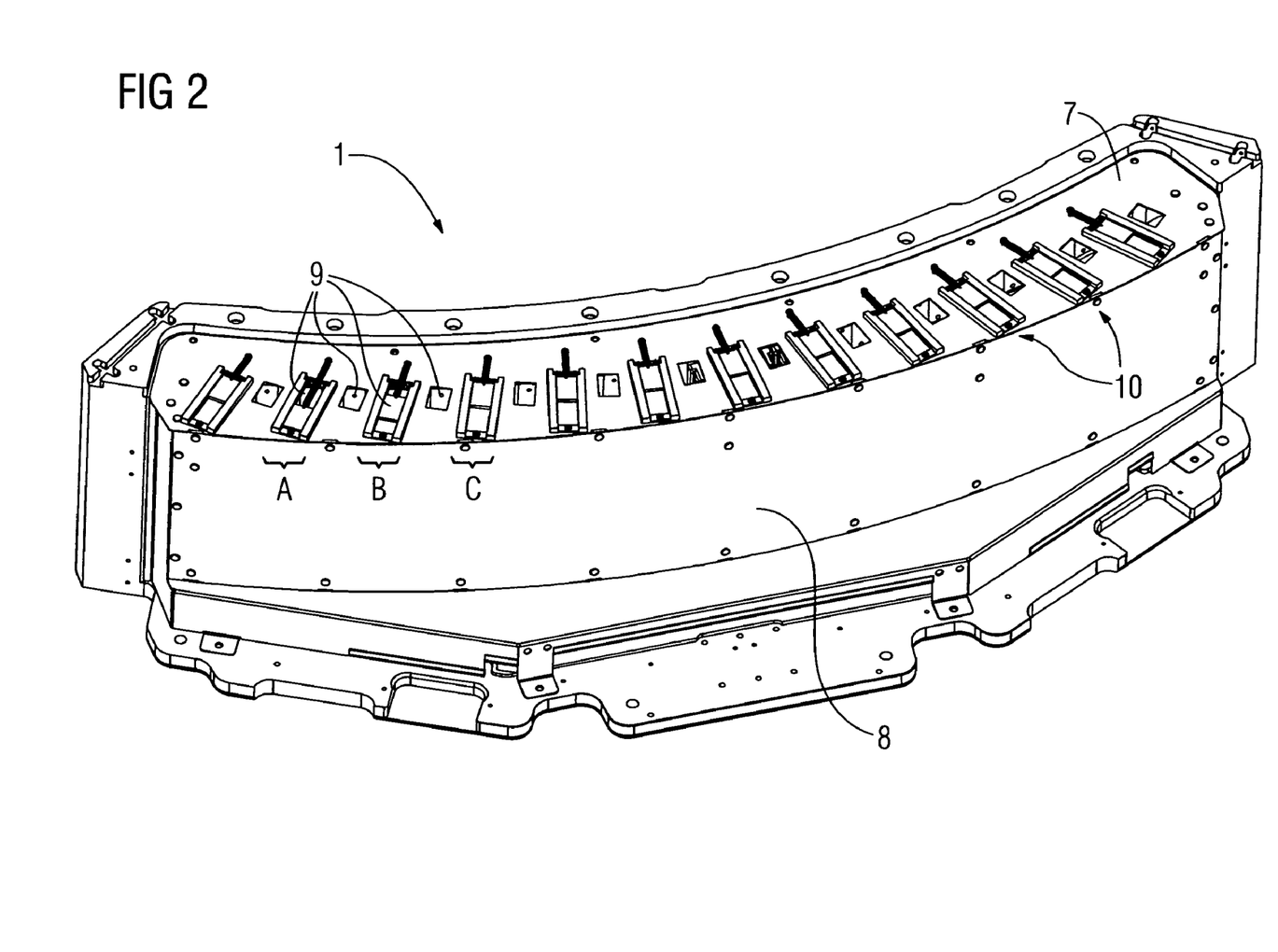
FIG. 2 shows the detector housing closed by a first housing wall according to an embodiment of the invention.

FIG. 2 shows the detector housing 1 closed by a first housing wall 7 according to an embodiment of the invention. The first housing wall 7 is used as a side wall, and is illustrated located at the front in FIG. 2. A bottom wall 8, which will not be described any further, is provided in order to cover the bottom. The bottom wall 8 may be formed integrally with the first housing wall 7. Ventilation openings 9 are provided in the first housing wall 7. A centrifugal force regulator 10 is in each case provided for every alternate ventilation opening 9. A first to a third operating state A to C of the centrifugal force regulators 10 is shown for illustrative purposes.

Figure 3:
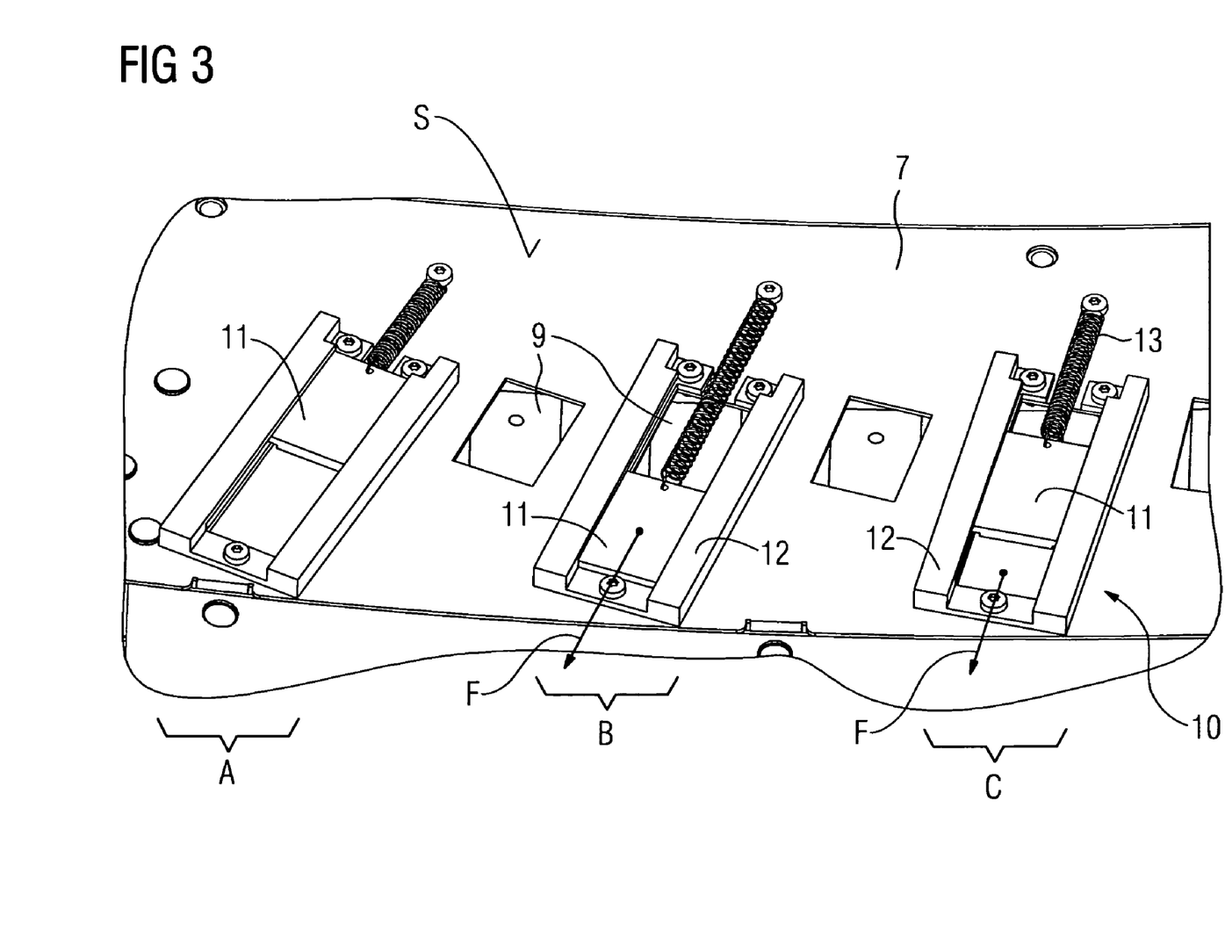
FIG. 3 shows an enlarged section of the first housing wall.

One configuration of the centrifugal force regulators 10, and in particular of the first to third operating states A to C, is illustrated in detail in the enlarged section of the first housing wall 1 shown in FIG. 3. The centrifugal force regulator 10 has a first associated closure device 11 for closing the respective ventilation opening 9. The first closure device 11 is in the form of a slide. The centrifugal force regulator 10 has guides 12 for guiding the first closure device 11. The guides 12 are fitted on an outer face S of the first housing wall 7. Furthermore, the centrifugal force regulator 10 has a tension spring 13.

A first end of the tension spring 13 is attached to the first closure device 11, while a second end of the tension spring is fitted to the first housing wall 7. The tension spring 13 is a helical spring. The tension spring 13 forces the first closure device 11, corresponding to the first operating position A, to a position in which the corresponding ventilation opening 9 is closed. When a centrifugal force F acts on the first closure means 11 against the spring force, then, depending on the magnitude of the centrifugal force F, the magnitude of the spring constant of the tension spring 13 and the mass of the first closure means 11, the ventilation opening 9 is opened to a greater or lesser extent, as is illustrated schematically by the second and third operating states B and C.

Figure 4:
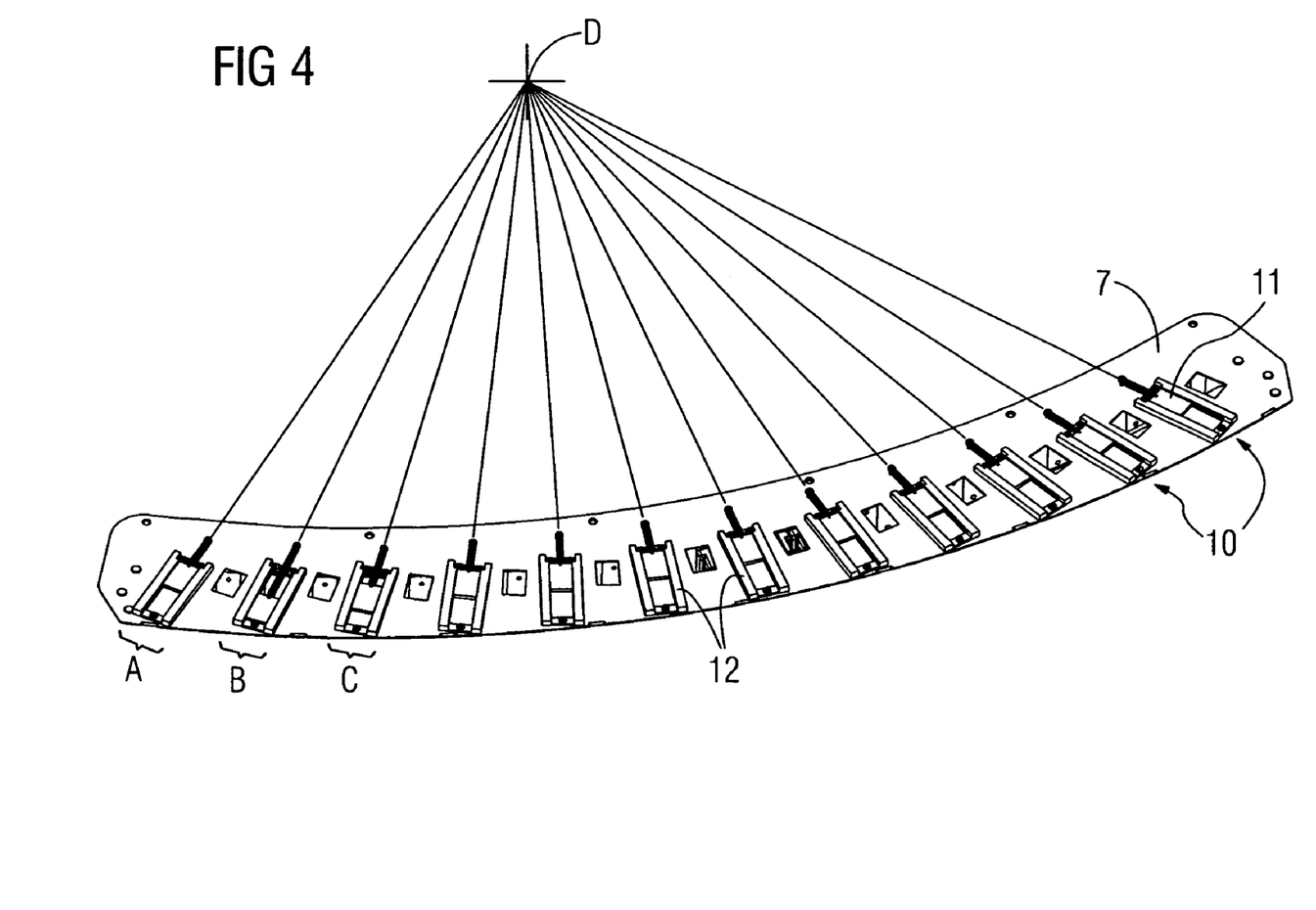
FIG. 4 shows a plan view of the first housing wall.

FIG. 4 shows a plan view of the outer face S of the first housing wall 7. As can be seen from FIG. 4, the guides 12 for the centrifugal force regulators 10 are aligned with respect to a rotation center D of the X-ray computed-tomography scanner such that, during rotation of the detector unit about the rotation center D, the centrifugal force F acts on the first closure device 11 in the radial direction with respect to the rotation center D. This allows the first closure device 11 to be moved in the guides 12 with particularly little friction and wear.

The first housing wall 7 operates as follows:

An air flow at a suitable temperature is passed via the through-holes 6 into the detector housing 1 in order to cool the detector elements 4. The air flow emerging from the through-holes 6 flows directly to the detector elements 4 and past electronic components associated with them, or strikes them, and can emerge again when the detector unit is in the static state at least at the ventilation openings 9, which are not closed by first closure device 11. The air flow can also be passed through the detector housing 1 in the opposite direction.

When the detector unit is rotated about the rotation center D during operation of the X-ray computed-tomography scanner, then the centrifugal force F acts on the first closure device 11. The centrifugal force F opposes the spring force exerted by the tension spring 13 on the first closure device 11. Depending on the spring constants of the tension spring 13 and/or the mass of the first closure device 11, the ventilation openings 9, which are closed in the static state, are opened to a greater or lesser extent. This results in the flow cross section of the ventilation openings 9 being correspondingly increased to a greater or lesser extent. This makes it possible to counteract any reduction in the amount of air being passed through the detector housing 1 as the rotation speed increases. If the spring constants of the tension spring 13 and/or the mass or masses of the first closure device 11 are chosen appropriately, it is possible to ensure that the flow cross section for the air flow is adapted such that the air flow is essentially independent of the rotation speed of the detector unit. This makes it possible to ensure that the detector elements 4 are cooled at an essentially constant level over time, and thus to achieve particularly good image quality.

Instead of the tension spring 13, it is also possible to provide a compression spring, with the first closure device 11 and the compression spring being arranged in a geometrically opposite form, in this case.

The guides 12 are aligned with the rotation center D. This makes it possible to ensure that the centrifugal force F acts parallel to the guides 12. It is possible to avoid the sliding friction between the guide 12 and the first closure device 11 being increased by the centrifugal force F. This allows the first closure means 11 to be moved in the guides 12 with particularly little wear.

The through-holes 6 and the ventilation openings 9 are arranged along an azimuth line with respect to the rotation center D. This is particularly advantageous because this makes it possible to pass the air flow directly to the detector elements 4 which are arranged in an analogous manner.

In the embodiment described above, a centrifugal force regulator 10 and a first closure device 11 are provided only for every alternate ventilation opening 9. The number and arrangement of the centrifugal force regulators 10, as well as the ventilation openings 9 associated with a centrifugal force regulator 10, can be matched to the corresponding requirements and to the arrangement of the detector elements 4 as required in a simple manner, as is illustrated, by way of example, in a further refinement in FIGS. 5 and 6.

Figure 5:
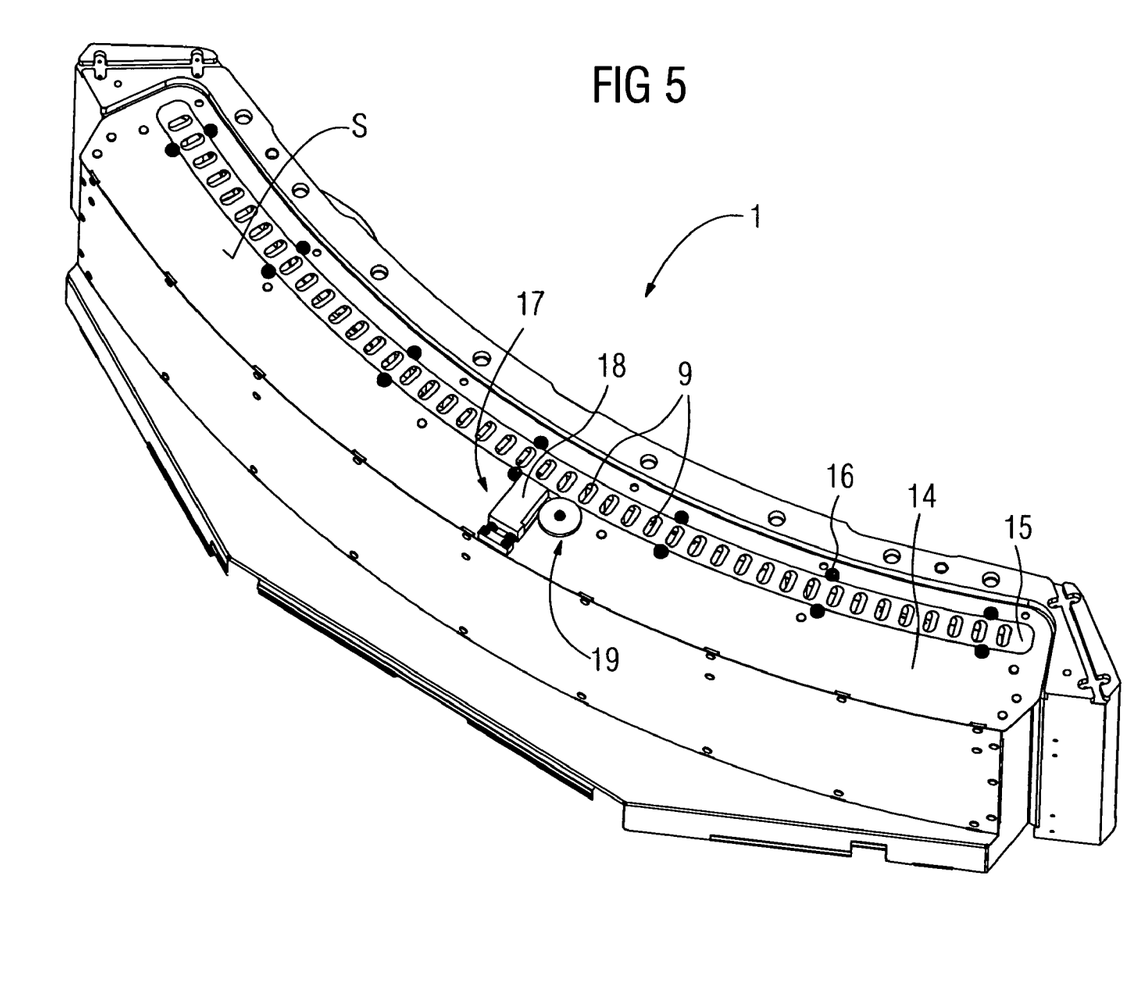
FIG. 5 shows the detector housing closed by a second housing wall.

FIG. 5 shows the detector housing 1 shown in FIG. 1, closed by a second housing wall 14. As a modification to the first housing wall 7, a single, second closure device 15 is provided in order to close the ventilation openings 9. The second closure device 15 is provided on the outer face S of the second housing wall 14, and is mounted such that it can be moved in the azimuth direction with respect to the rotation center D, by way of guide rollers 16. A second centrifugal force regulator 17 comprises a control mass 18 and a control mechanism 19.

The second closure device 15 is coupled via the control mechanism 19 to the control mass 18 such that a first position change of the control mass 18 can be transferred to the second closure device 15.

Figure 6:
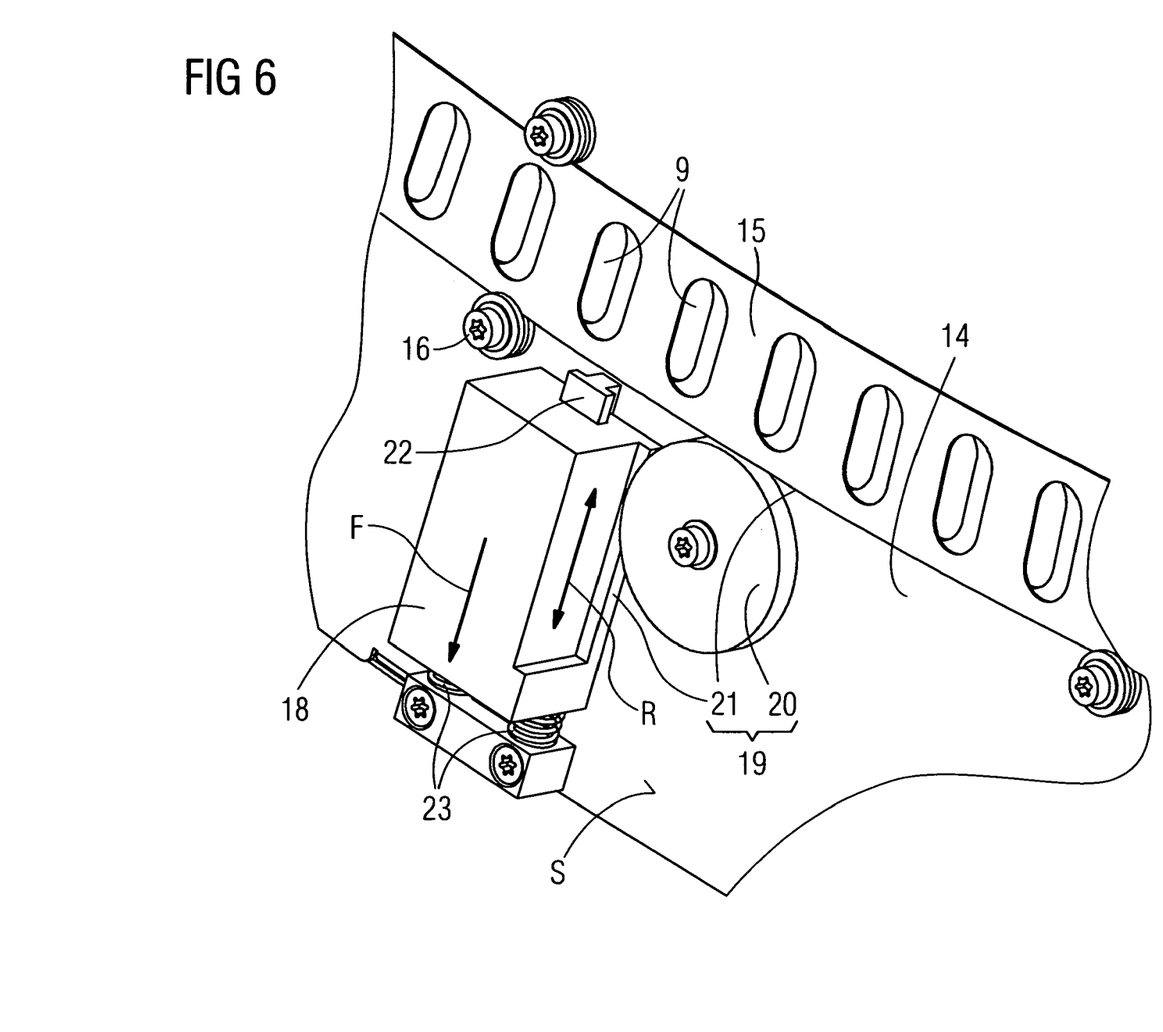
FIG. 6 shows an enlarged section of the second housing wall.

FIG. 6 shows a section of the second housing wall 14, enlarged. The control mechanism 19 comprises a toothed wheel 20 and in each case one toothed rod 21, which is provided on the second closure device 15 and on the control mass 18 and with which the toothed wheel 20 engages. The control mass 18 can be moved along a guide rail 22 in the radial direction R with respect to the rotation center D. The control mass 18 is prestressed by way of two compression springs 23 in the opposite direction to the centrifugal force F which acts in the radial direction R on the control mass 18 during rotation about the rotation center D.

In FIG. 6, the centrifugal force F is illustrated only for clarity purposes, because FIG. 6 shows the second housing wall 14 in the static state, that is to say with no centrifugal force F acting on the control mass 18. The ventilation openings 9 are not entirely closed by the second closure means 15, so that it is possible to ensure that there is a basic flow rate of cooling air through the through-holes 6 and ventilation openings 9 in order to cool the detector elements 4.

In the refinement shown in FIGS. 1 to 4 this is achieved by those ventilation openings 9 which are not covered by first closure device(s) 11. When the centrifugal force F acts on the control mass 18, this is forced outwards in the radial direction R with respect to the rotation center D, against the spring force of the compression springs 23. In consequence, the toothed wheel 20 rotates to the left when seen in a plan view. The second closure device(s) 15 is moved to the left in the plan view, as a result of the toothed rods 21 and the toothed wheel 20 engaging in one another. This results in the ventilation openings 9 being opened further, thus resulting in the air flow rate through the detector housing 1 remaining essentially constant.

In an embodiment of the present refinement, the ventilation openings 9 are each opened or closed to the same extent. In order to control the air flow as a function of position, the ventilation openings 9 may, however, also be designed such that movement of the second closure device(s) 15 leads to respectively specific release or coverage of the corresponding ventilation opening 9. In comparison to the refinement shown in FIGS. 1 to 4, the refinement shown in FIGS. 5 and 6 has the advantage that fewer moving parts are provided overall.

The housing wall according to an embodiment of the invention therefore makes it possible to ensure that the detector element can be cooled by way of a directed air flow essentially independently of the rotation speed of the detector unit. This makes it possible to avoid the image quality of X-ray images being adversely affected as a result of temperature fluctuations of the detector elements. The housing wall according to an embodiment of the invention allows a significant functional improvement, with little design complexity at the same time. The ventilation opening which is controlled by centrifugal force is particularly suitable for use in housings such as those of an X-ray computed-tomography scanner, which are rotated about a rotation center during operation and whose interior is in this case intended to be cooled at the same time by way of an air flow.

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A housing wall for a detector housing of a detector unit, which is rotatable about a rotation center of an X-ray computed-tomography scanner, including a multiplicity of detector elements to detect X-ray radiation, the housing wall comprising:
   a plurality of ventilation openings for a directed air flow, intended for cooling of the detector elements, to be passed through the detector housing;
   at least one closure device for at least partial closure of the ventilation openings; and
   at least one centrifugal force regulator, the at least one centrifugal force regulator interacting with the at least one closure device such that they are forced to a closed position in which the ventilation openings are at least partially closed by the at least one closure device, the ventilation openings being opened as a function of a magnitude of a centrifugal force which occurs during rotation about the rotation center.

2. The housing wall as claimed in claim 1, wherein the at least one centrifugal force regulator includes a centrifugal force regulator, which interacts with in each case one closure device, being provided for each ventilation opening.

3. The housing wall as claimed in claim 1, wherein the at least one centrifugal force regulator includes only one centrifugal force regulator, and the at least one closure device includes only one closure device, for all of the ventilation openings.

4. The housing wall as claimed in claim 1, wherein the ventilation openings are provided along at least one of a straight and curved line with respect to the rotation center.

5. The housing wall as claimed in claim 1, wherein the at least one closure device is in the form of a slide, and wherein guides are provided on the housing wall, in order to guide the at least one closure device.

6. The housing wall as claimed in claim 1, wherein the at least one closure device is moveable at least one of radially and in the azimuth direction with respect to the rotation center.

7. The housing wall as claimed in claim 1, wherein the centrifugal force regulator includes a spring, which forces the at least one closure device to the closed position, the spring being at least one of a helical spring, a spiral spring and a leaf spring.

8. The housing wall as claimed in claim 7, wherein a first end of the spring is attached to at least one of the at least one closure device, and with a second end being attached to the housing wall.

9. The housing wall as claimed in claim 1, wherein the centrifugal force regulator includes a movable control mass and a control mechanism, coupled to the control mass and to the at least one closure device such that a first position change of the control mass, which is produced by a change in the centrifugal force, is translated to a corresponding second position change of the at least one closure device.

10. The housing wall as claimed in claim 9, wherein the control mass is prestressed.

11. The housing wall as claimed in claim 9, wherein the control mechanism includes at least one of a toothed rod, a toothed ring and a toothed wheel.

12. The housing wall as claimed in claim 11, wherein at least one of the toothed wheel and the toothed ring are attached to the housing wall such that it can rotate about a rotation axis, and engages in, in each case, one toothed rod, provided on the control mass and on the at least one closure device.

13. A detector housing comprising a housing wall as claimed in claim 1.

14. The housing wall as claimed in claim 2, wherein the ventilation openings are provided along at least one of a straight and curved line with respect to the rotation center.

15. The housing wall as claimed in claim 3, wherein the ventilation openings are provided along at least one of a straight and curved line with respect to the rotation center.

16. The housing wall as claimed in claim 2, wherein the closure devices are each in the form of a slide, and wherein guides are provided on the housing wall, in order to guide the closure devices.

17. The housing wall as claimed in claim 2, wherein the closure devices are moveable at least one of radially and in the azimuth direction with respect to the rotation center.

18. The housing wall as claimed in claim 3, wherein the closure device is in the form of a slide, and wherein guides are provided on the housing wall, in order to guide the closure device.

19. The housing wall as claimed in claim 3, wherein the closure device is moveable at least one of radially and in the azimuth direction with respect to the rotation center.

20. The housing wall as claimed in claim 9, wherein the control mass is spring prestressed such that the at least one closure device is forced to the closed position.

21. A detector housing comprising a housing wall as claimed in claim 2.

22. A detector housing comprising a housing wall as claimed in claim 3.

23. An X-ray computed-tomography scanner comprising a detector unit, the detector unit including the detector hosing of claim 13.

24. An X-ray computed-tomography scanner comprising a detector unit, the detector unit including the detector hosing of claim 21.

25. An X-ray computed-tomography scanner comprising a detector unit, the detector unit including the detector hosing of claim 22.

* * * * *